United States Patent
Aoyama

(10) Patent No.: US 8,091,053 B2
(45) Date of Patent: Jan. 3, 2012

(54) SYSTEM, METHOD, AND PROGRAM FOR GENERATING CIRCUIT

(75) Inventor: Tetsuya Aoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 571 days.

(21) Appl. No.: 11/907,712

(22) Filed: Oct. 16, 2007

(65) Prior Publication Data

US 2008/0092103 A1 Apr. 17, 2008

(30) Foreign Application Priority Data

Oct. 17, 2006 (JP) ................................. 2006-282810

(51) Int. Cl.
*G06F 17/50* (2006.01)
(52) U.S. Cl. ........................................ 716/109; 716/108
(58) Field of Classification Search .................. None
See application file for complete search history.

(56) References Cited

U.S. PATENT DOCUMENTS

| | | | | |
|---|---|---|---|---|
| 6,105,139 | A * | 8/2000 | Dey et al. ....................... | 713/300 |
| 6,195,786 | B1 * | 2/2001 | Raghunathan et al. ............ | 716/2 |
| 6,324,679 | B1 * | 11/2001 | Raghunathan et al. .......... | 716/18 |
| 6,832,363 | B2 * | 12/2004 | Ohnishi .............. | 716/18 |
| 7,134,100 | B2 * | 11/2006 | Ravi et al. .......................... | 716/2 |
| 7,152,218 | B2 * | 12/2006 | Okada ............................. | 716/18 |
| 2006/0150135 | A1 * | 7/2006 | Hamada et al. ................. | 716/12 |
| 2006/0225022 | A1 * | 10/2006 | Ezaki ............................. | 716/18 |

FOREIGN PATENT DOCUMENTS

| | | |
|---|---|---|
| JP | 2002-366596 | 12/2002 |
| JP | 2004-326463 | 11/2004 |
| JP | 2006-139624 | 6/2006 |
| JP | 2006-155533 | 6/2006 |

OTHER PUBLICATIONS

Banerjee et al., "Low Power Synthesis of Dynamic Logic Circuits Using Fine-Grained Clock Gating", Proc. 2006 Design, Automation and Test in Europe (DATE '06), 6 pages.*
Wu et al., "Clock-Gating and Its Application to Low Power Design of Sequential Circuits," IEEE Trans. on Circuits and Systems—I: Fundamental Theory and Applications, vol. 47, No. 103, Mar. 2000, pp. 415-420.*
Agarwal et al., "Power Efficient Rapid Hardware Development using CoDeL and Automated Clock Gating," ISCAS 2006, IEEE, pp. 5307-5310.*
Oh et al., "Gated Clock Routing for Low-Power Microprocessor Design," IEEE Trans. on CAD of ICs and Systems, vol. 20, No. 6, Jun. 2001, pp. 715-722.*
Donno et al., "Clock-Tree Power Optimization based on RTL Clock-Gating," DAC 2003, pp. 622-627.*

(Continued)

*Primary Examiner* — Leigh Garbowski
(74) *Attorney, Agent, or Firm* — McGinn IP Law Group, PLLC

(57) ABSTRACT

An aspect of the invention provides a circuit generation system that can automatically generate a power control circuit. In the circuit generation system according to the aspect of the invention includes a behavioral synthesis unit that generates synthesis-attached information and RT-level circuit information based on behavioral-level description information in which information on a circuit is described by a program language; and a power control circuit generation unit that generates a power control circuit based on the synthesis-attached information, and connects the generated power control circuit to an RT-level circuit of the RT-level circuit information.

15 Claims, 16 Drawing Sheets

OTHER PUBLICATIONS

Farrahi et al., "Activity-Driven Clock Design," IEEE Trans. on CAD of ICs and Systems, vol. 20, No. 6, Jun. 2001, pp. 705-714.*

Shinichiro Mutoh, et al. "Design Method of MTCMOS Power Switch for Low-Voltage High-Speed LSIs", ASP-DAC, 1999, pp. 113-116.

Shinichiro Mutoh, et al. "1-V Power Supply High-Speed Digital Circuit Technology with Multithreshold-Voltage CMOS", IEEE JSSC, vol. 30, No. 8, pp. 847-854, Aug. 1995.

Tadahiro Kuroda, et al. A 0.9-V, 150-MHz, 10-mW, 4 mm2, 2-D Discrete Cosine Transform Core Processor with Variable Threshold-Voltage (VT) Scheme, IEEE Journal of Solid-State Circuits, vol. 31, No. 11, Nov. 1996, pp. 1770-1779.

Japanese Office Action dated Mar. 29, 2011 with a partial English translation.

* cited by examiner

FIG. 3

```
process main (int c)
{
c = func1();  /* n1 clock */
if (c) {
func2();  /* n2 clock */
} else {
func3();  /* n3 clock */
}
}
```

FIG. 8

```
process main(int a, int c, int v)
{
    wait(c);
    if (a > 0) {
        out0 = func4(v);    /* 1clock */
    else {
        out0 = func5(v);    /* 2clock */
    }
}
```

FIG. 12

```
main(int in0, int out0, int a, int b)
{
    out0 = func_static(in0, a, b);      /* static presence of access to static variable */
    out0 = func_no_static(in0, a, b);   /* static absence of access to static variable */
} int func_static(int u1, int u2, int u3)
{
    static s = 0;   /* static static variable */
    if (u1){
        s = s + u1;
    else {
        s = s - u2;
    }
    return s;
} int func_no_static(int v1, int v2, int v3)
{
    int t = 0;
    if(v1){
        t = t + v2;
    else {
        t = t - v3;
    }
    return t;
}
```

SYSTEM, METHOD, AND PROGRAM FOR GENERATING CIRCUIT

This application is based upon and claims the benefit of priority from Japanese patent application No. 2006-282810 filed on Oct. 17, 2006, the disclosure of which is incorporated herein in its entirety by reference.

BACKGROUND OF THE INVENTION

1. Field of the Invention

The present invention pertains to a system, a method, and a program for making it possible to generate a circuit based on behavioral-level description information in which information on the circuit is described at a behavioral level, particularly to the system, the method, and the program for making it possible to automatically generate a power control circuit.

2. Description of the Related Art

Recently, with rapid progress in semiconductor process technology, a scale of circuit design has been enlarged, and the circuit has become complicated. This causes two serious problems as described below.

One of the problems is a problem on productivity of the design.

There is a large difference between a design scale of a circuit required of a designer within a predetermined design period and a design scale of a circuit which the designer can actually design within the predetermined design period, and the difference has been increasing year by year.

However, the above problem on the design productivity has long been present, and solved by an EDA (Electronic Design Automation) tool each time the problem became prominent.

An automatic place-and-route tool utilized in the late 1970s and a logic synthesis tool utilized in the late 1980s to the early 1990s can be cited as examples of the EDA tool.

Currently a better EDA tool is desired because the problem on the design productivity has become prominent again. Therefore, recently a behavioral synthesis tool attracts attention as the EDA tool.

The behavioral synthesis tool generates circuit description information (RT-level circuit information) at a register transfer level (RT-level) from circuit description information at a behavioral level.

In the behavioral synthesis tool, because the circuit is described at the behavioral level, the same function can be expressed by lesser description. Additionally, the behavioral synthesis tool can make verification at the behavioral level at a speed higher than that of the RT-level circuit.

Therefore, the behavioral synthesis tool has been used in the late 1990s.

The second problem is a problem on power consumption.

An electric power consumed in the circuitry tends to increase by improvement of an integration degree of circuits.

Although, until now, the reduction in dynamic power consumption consumed in operating a circuit has been the most important problem, recently the reduction in static power consumption caused by a leak current and the like also becomes important with an advancement in microfabrication technique.

Therefore, there is disclosed a low power consumption design technology concerning clock gating and power gating (for example, see Shinichiro Mutoh, et al., "Design Method of MTCMOS Power Switch for Low-Voltage High-Speed LSIs," ASP-DAC, 1999).

There is also disclosed MT (Multi Threshold)-CMOS (for example, see Shinichiro Mutoh, et al., "1-V Power Supply High-Speed Digital Circuit Technology with Multithreshold Voltage CMOS," IEEE JSSC, vol. 30, no. 8, pp 847-854, August 1995).

There is also disclosed VT (Variable Threshold)-CMOS (for example, see Tadahiro Kuroda, et al., "A 0.9V, 150-MHz, 10-mW, 4 $mm^2$, 2-D Discrete Cosine Transform Core Processor with Variable Threshold-Voltage (VT) Scheme," IEEE JSSC, vol. 31, no. 11, pp. 1770-1779, November 1996).

There is disclosed a technique of generating circuit description in which clock gating is automatically given when a circuit described by a high-level language is synthesized at high level and converted into description of RTL (for example, see Japanese Patent Application Laid-Open No. 2006-155533).

There is disclosed a technique of functioning as a circuit design support device which can easily recognize a correlation of design information between design processes (for example, see Japanese Patent Application Laid-Open No. 2006-139624).

There is disclosed a technique where a loop processing in a control data flow graph (CDFG) is pipelined with a small increased area in behavioral synthesis in which hardware is synthesized from the operation description (for example, see Japanese Patent Application Laid-Open No. 2004-326463).

There is disclosed a technique of generating a low power consumption circuit in which the wasted electric power is decreased (for example, see Japanese Patent Application Laid-Open No. 2002-366596).

However, when the above conventionally proposed low power consumption design technologies are applied to the RT-level circuit, it is necessary to manually perform the design including the power control circuit. Therefore, a long design period or a verification period is required because a defect is probably mixed in the design. Accordingly, there is a demand for a technique for making it possible to automatically generate the power control circuit.

Although the technique of automatically generating the power control circuit is disclosed in Japanese Patent Application Laid-Open Nos. 2006-155533, 2006-139624, 2004-326463, and 2002-366596, there is no description in which the power control circuit is automatically generated by utilizing the detailed information on the component constituting the circuit.

SUMMARY OF THE INVENTION

In view of the foregoing, an exemplary object of the invention is to provide a system, a method, and a program for making it possible to automatically generate a power control circuit by utilizing detailed information on components constituting the circuit.

In order to achieve the object, the invention is configured as follows.

(Circuit Generation System)

A circuit generation system according to an exemplary aspect of the invention includes behavioral synthesis units that generate RT-level circuit information indicating a correlation between components constituting a circuit based on behavioral-level description information in which information on the circuit is described at a behavioral level; and a power control circuit generation unit that generates a power control circuit based on at least one piece of information of control information for controlling the component, control flow information indicating a control flow necessary for performing processing of the component, and delay information indicating a time necessary for performing processing of the component, and connects the generated power control circuit and the component.

(Circuit Generation Method)

In a circuit generation method according to an exemplary aspect of the invention, an information processing device performs a behavioral synthesis process of generating RT-level circuit information indicating a correlation between components constituting a circuit based on behavioral-level description information in which information on the circuit is described at a behavioral level; and a power control circuit generation process of generating a power control circuit based on at least one piece of information of control information for controlling the component, control flow information indicating a control flow necessary for performing processing of the component, and delay information indicating a time necessary for performing processing of the component, and connecting the generated power control circuit and the component.

(Circuit Generation Program)

A storage medium for storing a circuit generation program according to an exemplary aspect of the invention causes an information processing device to perform behavioral synthesis processing for generating RT-level circuit information indicating a correlation between components constituting a circuit based on behavioral-level description information in which information on the circuit is described at a behavioral level; and power control circuit generation processing for generating a power control circuit based on at least one piece of information of control information for controlling the component, control flow information indicating a control flow necessary for performing processing of the component, and delay information indicating a time necessary for performing processing of the component, and connecting the generated power control circuit and the component.

BRIEF DESCRIPTION OF THE DRAWINGS

FIG. 3 shows behavioral-level description information used in the circuit generation system;

FIG. 6 shows an example of a clock gating circuit;

FIG. 7 shows an example of a power gating circuit;

FIG. 8 shows behavioral-level description information used in a circuit generation system according to a second embodiment of the invention;

FIG. 12 shows behavioral-level description information used in a circuit generation system according to a fourth embodiment of the invention;

FIG. 15 shows an example of a gating circuit (p.m.c) which controls a power supply in a standby state.

DESCRIPTION OF EXEMPLARY EMBODIMENTS

A general outline of a circuit generation system according to an exemplary embodiment of the invention will be described.

Figure 1:
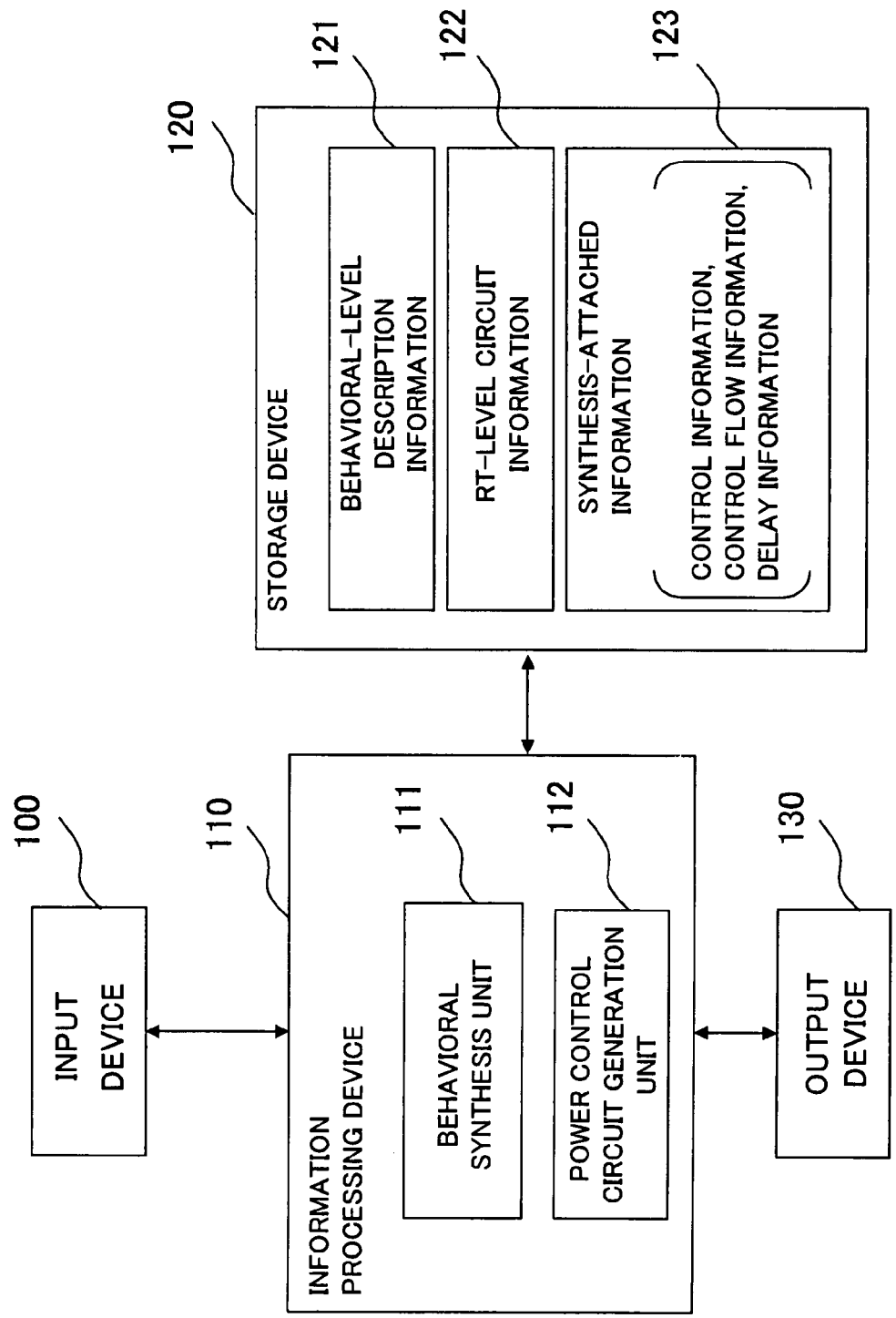
FIG. 1 is a block diagram showing an internal configuration of a circuit generation system according to an embodiment of the invention.

As shown in FIG. 1, the circuit generation system of an exemplary embodiment includes a behavioral synthesis unit 111 that generates RT-level circuit information 122 indicating a correlation between components constituting a circuit based on behavioral-level description information 121 in which information on the circuit is described at a behavioral level; and a power control circuit generation unit 112 that generates a power control circuit based on at least one piece of information of control information for controlling the component, control flow information indicating a control flow necessary for performing processing of the component, and delay information indicating a time necessary for performing processing of the component, and connects the generated power control circuit and the component.

Therefore, in the circuit generation system of an exemplary embodiment, the power control circuit can automatically be generated by utilizing detailed information on the component constituting the circuit. As a result, it is not needed to manually perform the design including the power control circuit, so that the circuit designer can design the high-quality and high-reliability power control circuit in a short period. The circuit generation system of the embodiment will be described in detail with reference to the drawings.

(System Configuration of Circuit Generation System)

A configuration of the circuit generation system of an exemplary embodiment will be described with reference to FIG. 1.

As shown in FIG. 1, the circuit generation system includes an input device 100, an information processing device 110, a storage device 120, and an output device 130.

(Input Device: 100)

The input device 100 is used to input the behavioral-level description information 121 and the like. Examples of the input device 100 include a keyboard, a floppy disk reading device and the like. Any device can be used as the input device 100 as long as the device can obtain the behavioral-level description information 121 and the like.

In the behavioral-level description information 121, the information on the circuit is described at the behavioral level. Specifically, the behavioral-level description information 121 is one in which an operation algorithm of the circuit is expressed without considering components such as a register and a logic element constituting the circuit. Although the behavioral-level description information 121 shall generally mean information that does not include a concept of time, sometimes the behavioral-level description information 121 shall mean information that includes the concept of time.

For example, the behavioral-level description information 121 can be described by a programming language such as C language, C++ language, Java (registered trademark) language, SystemC, SpecC and the like.

(Information Processing Device: 110)

The information processing device 110 is used to perform information processing, and is operated by program control.

(Storage Device: 120)

The storage device 120 stores information. The behavioral-level description information 121 is stored in the storage device 120. The RT-level circuit information 122 and synthesis-attached information 123 are also stored in the storage device 120.

The RT-level circuit information 122 indicates the correlation between the components constituting the circuit. The register, the logic element between registers and the like can be cited as an example of the component. The RT-level circuit information 122 is used during the behavioral synthesis.

The synthesis-attached information 123 is generated by the behavioral synthesis unit 111 based on the behavioral-level description information 121 and a constraint condition. The constraint condition is used to decide performance of the circuit and the like. Examples of the constraint condition include such as an area, a frequency, and a power consumption value of the circuit.

(Output Device: 130)

The output device 130 is for outputting information. Examples of the output device 130 include such as a display device and a print device. Any device can be used as the output device 130 as long as the device can output the information.

The information processing device 110 constituting the circuit generation system of the embodiment includes CPU (Central Processing Unit) that performs predetermined processing according to a program and a memory in which the program is stored. CPU executes the program stored in the memory to virtually mount the behavioral synthesis unit 111 and power control circuit generation unit 112 of FIG. 1 on the information processing device 110. Functions of the behavioral synthesis unit 111 and power control circuit generation unit 112 that are virtually mounted on the information processing device 110 will briefly be described below.

(Behavioral Synthesis Unit: 111)

The behavioral synthesis unit 111 generates the RT-level circuit information 122 based on the behavioral-level description information 121, and stores the generated RT-level circuit information 122 in the storage device 120.

The behavioral synthesis unit 111 generates the synthesis-attached information 123 based on the behavioral-level description information 121, and stores the generated synthesis-attached information 123 in the storage device 120.

The synthesis-attached information 123 includes the control information, the control flow information, and the delay information.

The control information is for controlling an input and an output of the component that becomes a control target.

The control flow information is for indicating a flow of control necessary for performing processing of the component.

The delay information is for indicating a time necessary for performing processing of the component.

(Power Control Circuit Generation Unit: 112)

The power control circuit generation unit 112 generates the RT-level circuit to which the power control circuit is added based on the RT-level circuit information 122 and the synthesis-attached information 123.

(Processing Operation of Circuit Generation System)

Figure 2:
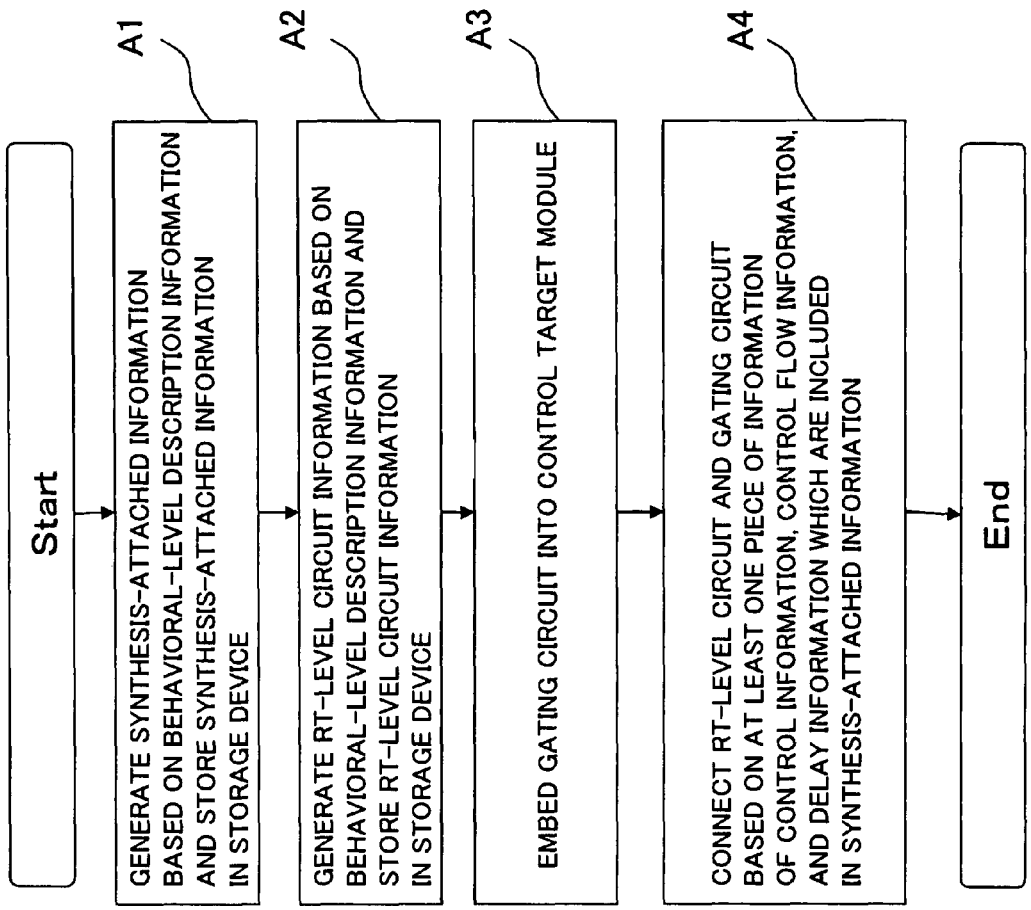
FIG. 2 is a flowchart showing a series of processing operations performed when the circuit generation system generates a circuit.

Then, a processing operation in the circuit generation system of an exemplary embodiment will be described with reference to FIG. 2. It is assumed that the behavioral-level description information 121 is previously stored in the storage device 120.

The behavioral synthesis unit 111 reads the behavioral-level description information 121 stored in the storage device 120, generates the synthesis-attached information 123 based on the read behavioral-level description information 121, and stores the generated synthesis-attached information 123 in the storage device 120 (Step A1).

The behavioral synthesis unit 111 generates the RT-level circuit information 122 based on the behavioral-level description information 121, and stores the generated RT-level circuit information 122 in the storage device 120 (Step A2).

The power control circuit generation unit 112 reads the RT-level circuit information 122 stored in the storage device 120, and embeds a gating circuit into a control target module of the RT-level circuit information 122 based on the read RT-level circuit information 122 (Step A3).

The power control circuit generation unit 112 reads the synthesis-attached information 123 stored in the storage device 120, and generates a gating control circuit based on at least one piece of information of the control information, control flow information, and delay information which are included in the read synthesis-attached information 123.

The power control circuit generation unit 112 connects the RT-level circuit of the RT-level circuit information 122 and the gating circuit embedded in the control target module of the RT-level circuit information 122 by the generated gating control circuit (Step A4).

Through the above series of processing, the control circuit system of the invention can generate the RT-level circuit with the power control circuit.

Therefore, in the circuit generation system, the power control circuit can automatically be generated by utilizing detailed information on the component constituting the circuit. As a result, it is not needed to manually perform the design including the power control circuit, so that the circuit designer can design the high-quality and high-reliability power control circuit in a short period.

Figure 16:
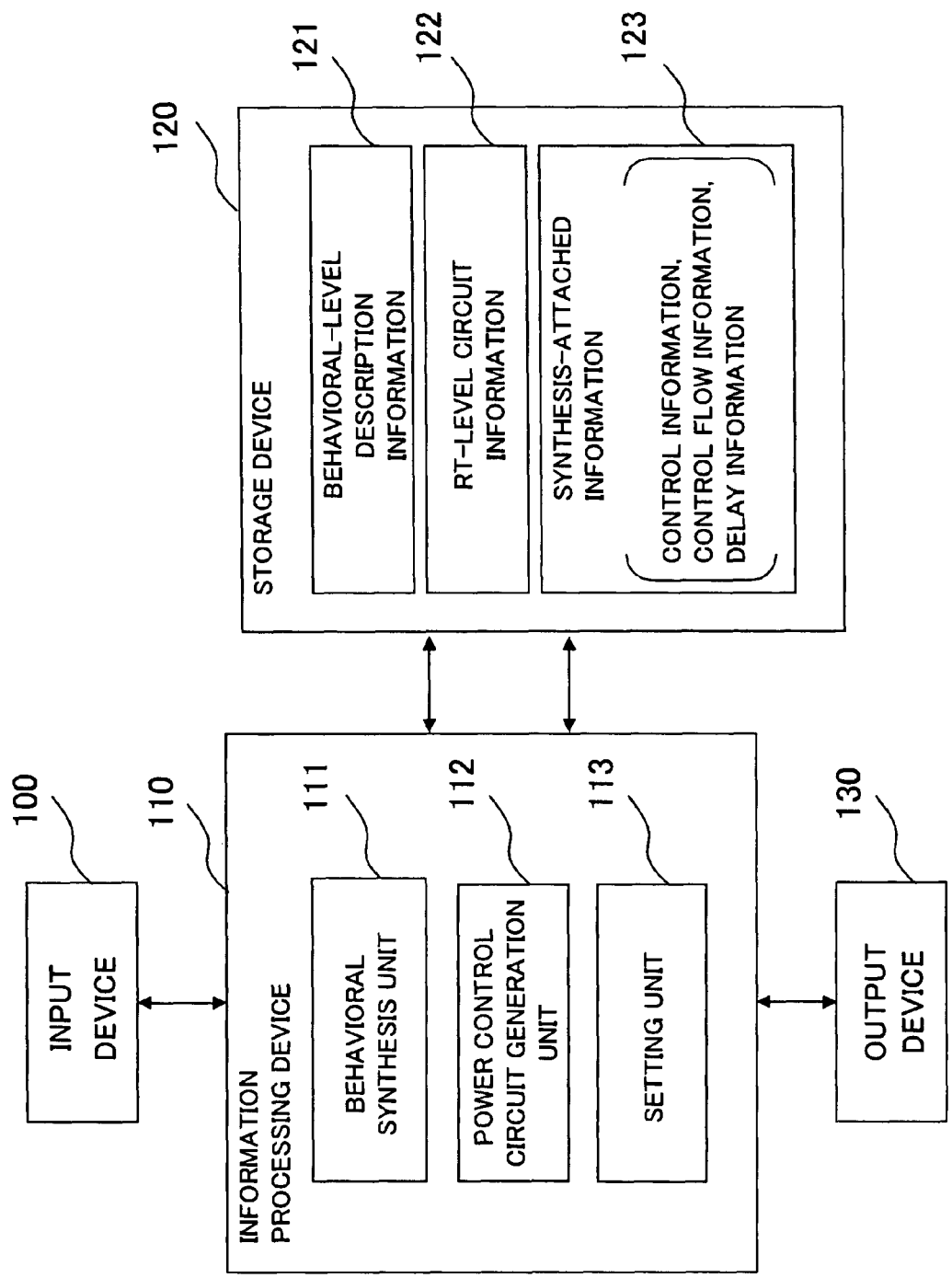
FIG. 16 is a block diagram showing an internal configuration of circuit generation system of the embodiment.

Alternatively, as shown in FIG. 16, in the above series of processing, the circuit generation system may include a setting unit 113 that sets at least one piece of information of the control information, the control flow information, and the delay information, wherein the power control circuit generation unit 112 is configured to generate the gating control circuit based on the information set by the setting unit 113.

The setting unit 113 may not be provided in the information processing device 110, but the setting unit 113 may be provided in the input device 100.

Because the behavioral synthesis unit 111 always generates the control flow information, the control flow information can be utilizes in generating the power control circuit. The control information can be utilized when the behavioral synthesis unit 111 generates the control information.

The delay information can be utilized when the behavioral synthesis unit 111 can obtain the delay information.

The case in which the circuit designer sets the delay information and the case in which the delay information is utilized when the behavioral synthesis unit 111 generates the RT-level circuit information 122 can be cited as an example of the case in which the behavioral synthesis unit 111 can obtain the delay information.

First Exemplary Embodiment

A first exemplary embodiment in which the RT-level circuit with the power control circuit is generated will be described below.

The case in which the RT-level circuit with the power control circuit is generated by utilizing the control information will be described in the first exemplary embodiment.

FIG. 3 shows the behavioral-level description information 121 described in the C language.

It is assumed that the whole function main( ) shown in FIG. 3 is synthesized in the RT-level circuit by the behavioral synthesis.

Functions "func1( ), func2( ), and func3( )" are described in the function main( ) shown in FIG. 3. The case in which a cycle number necessary for performing each of the functions "func1( ), func2( ), and func3( )" is unknown and each of the functions "func1( ), func2( ), and func3( )" is set to a unit of power control will be described.

Figure 4:
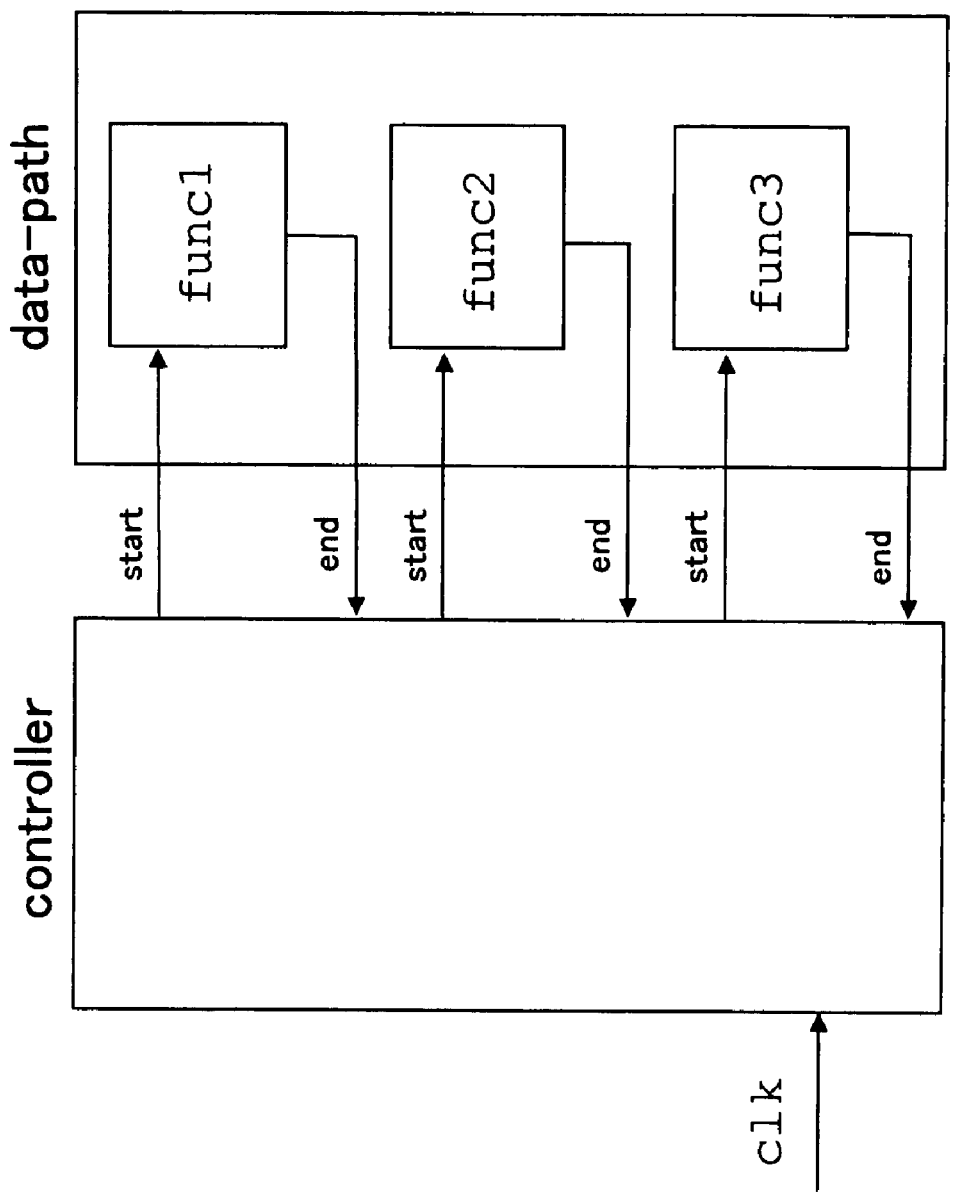
FIG. 4 is a first view for explaining a first embodiment in which the circuit generation system generates a circuit based on the behavioral-level description information of FIG. 3.

FIG. 4 is a block diagram showing a circuit which the behavioral synthesis unit 111 can generate based on the behavioral-level description information 121 of FIG. 3.

The method for realizing the circuit of FIG. 4 is an example of the method for realizing the circuit using the behavioral synthesis unit 111. The behavioral synthesis unit 111 realizes each of the functions "func1( ), func2( ), and func3( )" included in the behavioral-level description information 121 to a single control target module.

FIG. 4 also shows the case in which the behavioral synthesis unit 111 generates a start signal indicating the start of the operation to each of modules "fun1, func2, and func3" and an end signal indicating the end of the operation.

The start signal and end signal shown in FIG. 4 correspond to the control information.

The operation of the circuit of FIG. 4 will be described below.

A controller generates the start signals for controlling the modules (func1, func2, and func3) that become the control target, and transmits the generated start signals to the modules (func1, func2, and func3) existing in a data-path unit.

The modules (func1, func2, and func3) existing in the data-path unit receive the start signals transmitted by the controller, and start the operations. When the operations are ended, the modules (func1, func2, and func3) transmit the end signals to the controller.

When the controller receives the end signals transmitted from the modules (func1, func2, and func3), the controller detects the end of the operation in the modules (func1, func2, and func3), and transits to the next state.

The behavioral synthesis unit 111 divides the operation of the circuit of the behavioral-level description information 121 into plural states to realize an RTL circuit.

For example, in the circuit of FIG. 4, the controller divides the operation of the circuit of the behavioral-level description information 121 shown in FIG. 3 into plural states (execution states of func1, func2, and func3) to manage. The controller generates a control signal (start signal) for one state (fund execution state) in synchronization with a clock (clk) input to the controller, and transmits the generated control signal (start signal) to the data-path unit.

The data-path unit performs the operation of one state (func1 execution state) based on the control signal (start signal) transmitted from the controller, and transmits the control signal (end signal) to the controller when the operation of one state (func1 execution state) is ended.

When the controller receives the control signal (end signal) transmitted from the data-path unit, the controller detects the end of the operation of the state (func1 execution state), and transits to the next state (func2 execution state).

The controller generates a control signal (start signal) for one state (func2 execution state) in synchronization with the clock (clk) input to the controller, and transmits the generated control signal (start signal) to the data-path unit.

Thus, the controller divides the operation of the circuit of the behavioral-level description information 121 into the multiple states (execution states of func1, func2, and func3) to manage, and transmits sequentially in the multiple states (execution states of func1, func2, and func3) when the controller receives the control signal (end signal) transmitted from the data-path unit.

The controller does not transmit to another state (for example, from func1 execution state to func2 execution state) and repeatedly performs the same state (for example, func1 execution state) until the controller receives the control signal (end signal) from the data-path unit.

Figure 5:
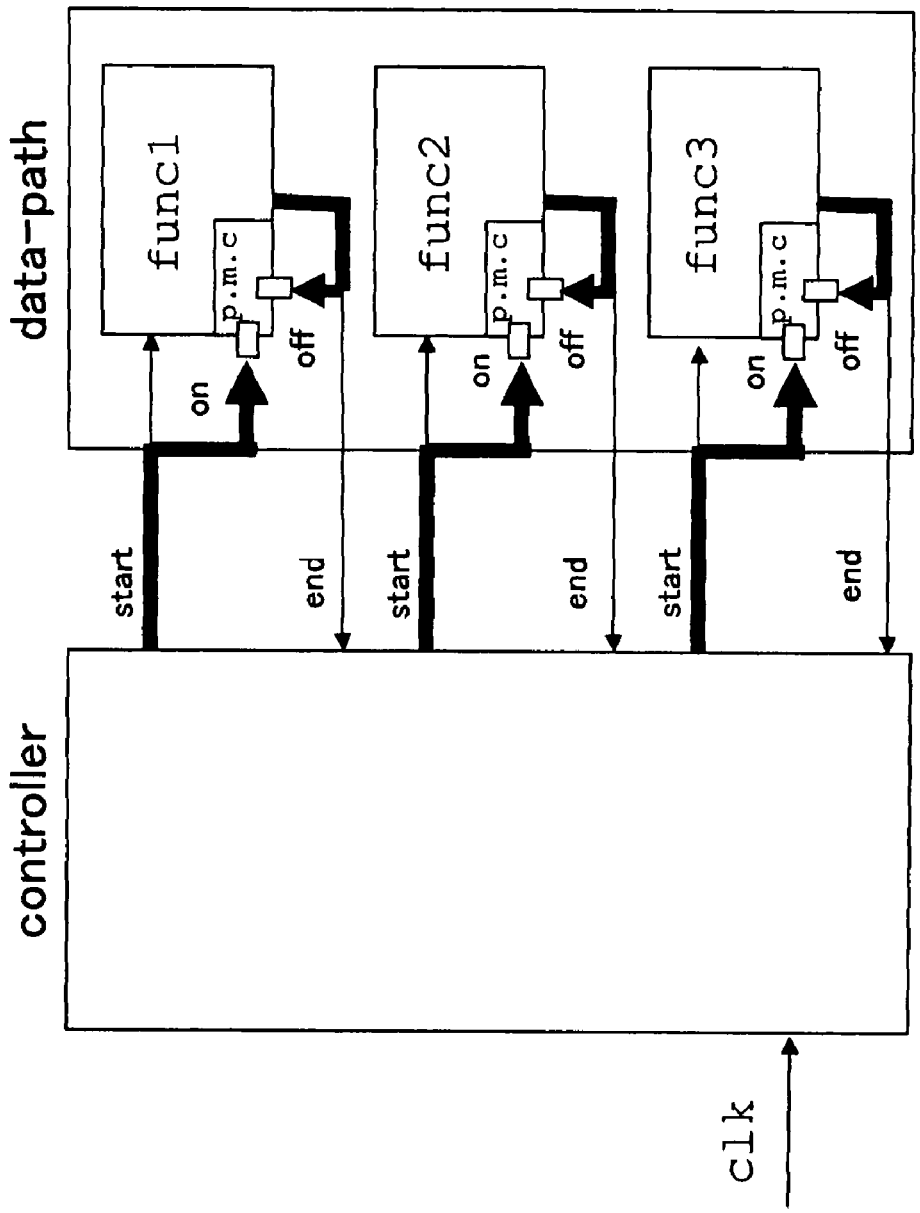
FIG. 5 is a second view for explaining the first embodiment in which the circuit generation system generates the circuit based on the behavioral-level description information of FIG. 3.

FIG. 5 is a block diagram showing a circuit that is generated by the circuit generation system. The circuit of FIG. 5 differs from the circuit of FIG. 4 in that the power control circuit is added to each of the control target modules (func1, func2, and func3).

As used herein, the power control circuit shall mean a circuit including a gating circuit (p.m.c) shown in FIG. 5 and a peripheral circuit necessary for the connection to the gating circuit (p.m.c). Although the peripheral circuit is not shown in FIG. 5, the peripheral circuit is a circuit including such an interconnection for connecting an on/off terminal of the gating circuit (p.m.c) of FIG. 5.

The power control circuit generation unit 112 generates the power control circuit of FIG. 5 through the following two kinds of processing.

First, in a first processing, the power control circuit generation unit 112 generates the gating circuit (p.m.c) for each of the control target modules (func1, func2, and func3).

Then, in a second processing, the power control circuit generation unit 112 generates a gating control circuit to connect the gating circuit (p.m.c) generated in the first processing and the RT-level circuit of the RT-level circuit information 122 generated by the behavioral synthesis unit 111.

(First Processing)

The first processing will be described.

In the first processing, the power control circuit generation unit 112 generates the gating circuit (p.m.c).

The gating circuit (p.m.c) is a circuit that generates the control signal for controlling the electric power.

The control signal generated by the gating circuit (p.m.c) is connected to a control terminal of the component in each of the control target modules (func1, func2, and func3).

For example, in the case of the clock gating, the control signal generated by the gating circuit (p.m.c) is connected to a clock terminal of the component in each of the control target modules (func1, func2, and func3).

Then, the power control circuit generation unit 112 generates an external terminal for the gating circuit (p.m.c).

Therefore, a signal can be input to the gating circuit (p.m.c) through the external terminal, and the gating circuit (p.m.c) can generate the control signal.

For example, in FIG. 5, the power control circuit generation unit 112 generates an ON terminal and an OFF terminal as the external terminal of the gating circuit (p.m.c).

Figure 6:
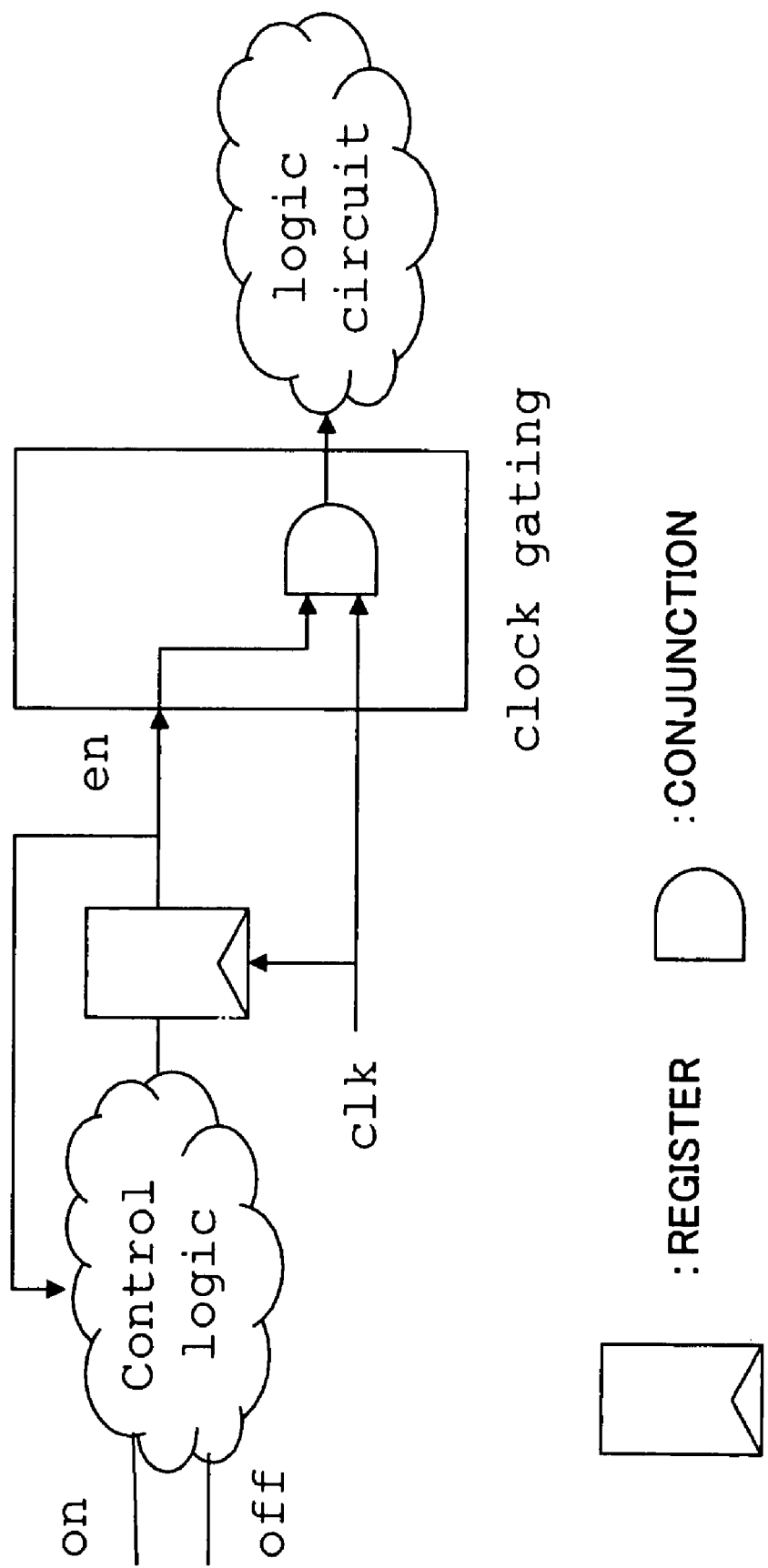
FIG. 6 is a third view for explaining the first embodiment in which the circuit generation system generates the circuit based on the behavioral-level description information of FIG. 3.

FIG. 6 shows the detailed gating circuit (p.m.c), showing an example of the clock gating circuit.

The power control circuit generation unit 112 generates a control signal (en) of the clock gating circuit based on the signal of the on/off terminal that is an external terminal, and connects the generated control signal (en) to the clock gating circuit.

The power control circuit generation unit 112 connects an output signal of the clock gating circuit to a clock terminal of the component in the control target module (logic circuit).

The clock gating circuit can be realized by the modules (func1, Func2, and func3) by the circuit shown in FIG. 6.

Figure 7:
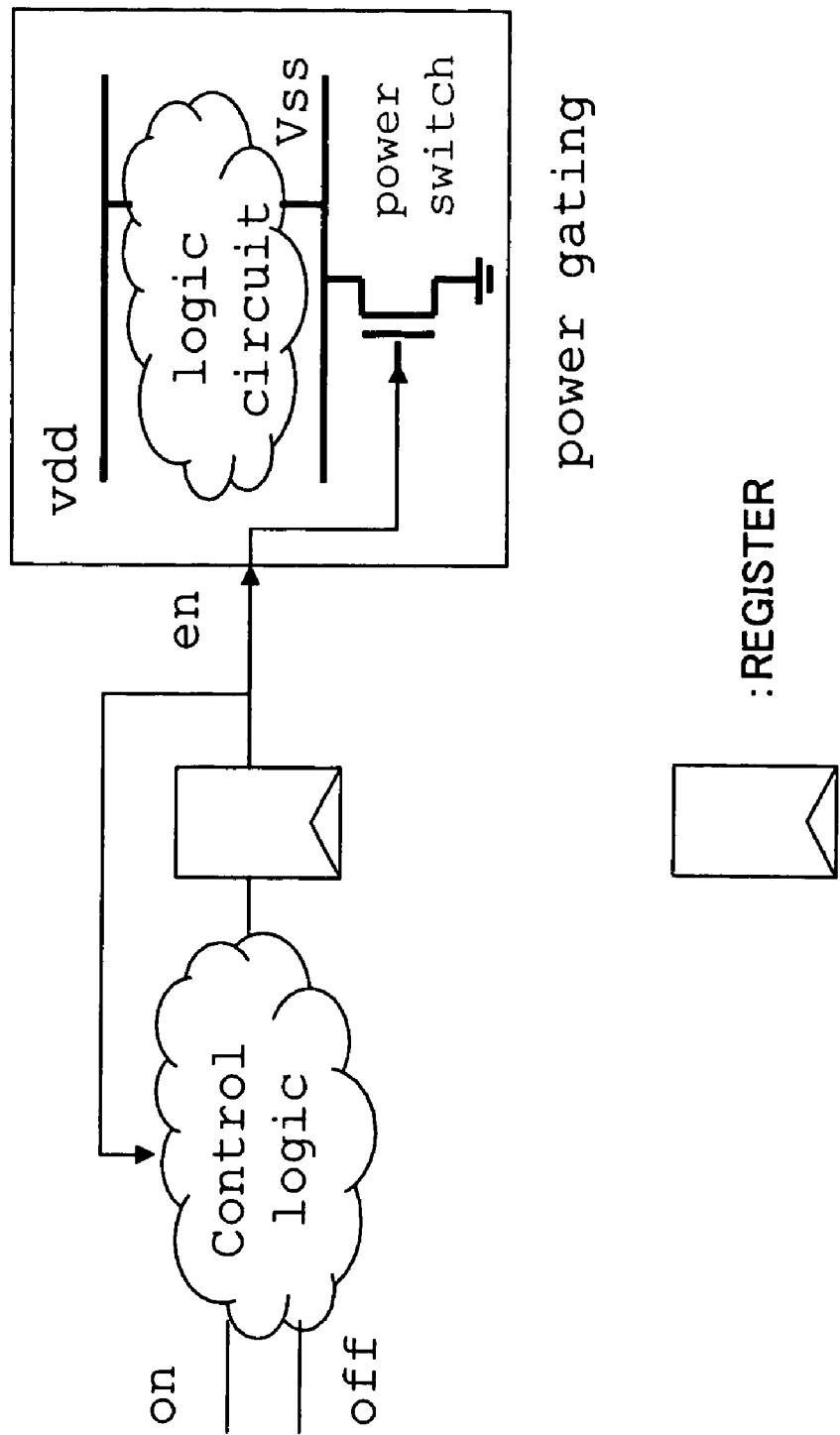
FIG. 7 is a fourth view for explaining the first embodiment in which the circuit generation system generates the circuit based on the behavioral-level description information of FIG. 3.

FIG. 7 shows an example of the power gating circuit.

Similarly to the clock gating circuit of FIG. 6, the power control circuit generation unit 112 generates the control signal (en) of the power gating circuit based on the signal of the on/off terminal that is an external terminal, and connects the generated control signal (en) to a power switch of the power gating circuit.

The power switch corresponds to a gate terminal of a transistor disposed between a ground and a virtual ground.

Thus, the gating circuit (p.m.c) of FIG. 5 can be replaced with various power management circuits shown in FIGS. 6 and 7, and the circuit generation system can realize various power management techniques by the module.

(Second Processing)

Then, the second processing will be described.

In the second processing, the power control circuit generation unit 112 connects the gating circuit (p.m.c) of FIG. 5 and the RT-level circuit of the RT-level circuit information 122 generated by the behavioral synthesis unit 111.

The control information (start signal and end signal) for each of the modules (func1, func2, and func3) generated by the behavioral synthesis unit 111 is utilized in connecting the gating circuit (p.m.c) and the RT-level circuit of the RT-level circuit information 122 generated by the behavioral synthesis unit 111.

The behavioral synthesis unit 111 generates a signal standby circuit and a signal output circuit in each of the modules (func1, func2, and func3) as the RT-level circuit of the-RT-level circuit information 122. The signal standby circuit waits for an input of the start signal, and the signal output circuit outputs the end signal.

The behavioral synthesis unit 111 generates a a start signal terminal and an end signal terminal as an input and output terminal of the signal. The power control circuit generation unit 112 utilizes the control information (start signal and end signal) for each of the modules (func1, func2, and func3), generated by the behavioral synthesis unit 111, to connect the gating circuit (p.m.c) and the RT-level circuit of the RT-level circuit information 122 generated by the behavioral synthesis unit 111.

As shown in FIG. 5, the power control circuit generation unit 112 connects the start signal generated for each of the modules (func1, func2, and func3) to the on terminal of the gating circuit (p.m.c), and connects the end signal to the off terminal of the gating circuit (p.m.c).

Therefore, the power control circuit generation unit 112 can utilize the control information (start signal and end signal) for each of the modules (func1, func2, and func3), generated by the behavioral synthesis unit 111, to connect the gating circuit of FIG. 5 and the RT-level circuit of the RT-level circuit information 122 generated by the behavioral synthesis unit 111.

Thus, based on the behavioral-level description information 121 in which the information on the circuit is described at the behavioral-level, the circuit generation system generates the RT-level circuit information 122 indicating the correlation between the control target modules constituting the circuit.

The power control circuit is generated based on the control information for controlling the control target module and connected with the control target module included in the behavioral-level description information 121, allowing the generation of the RT-level circuit to which the power control circuit is added.

Therefore, the circuit generation system of the first exemplary embodiment can automatically generate the power control circuit by utilizing the detailed information on the component constituting the circuit included in the behavioral-level description information 121.

As a result, it is not needed to manually perform the design including the power control circuit, so that the circuit designer can design the high-quality and high-reliability power control circuit in a short period.

Assuming that the behavioral synthesis unit 111 decides execution timing such that the modules func2 and func3 that are control target modules constituting the circuit are executed in the same state, in the conventional technique (for example, see Japanese Patent Application Laid-Open No. 2006-155533), the circuit that is operated in the state of the execution timing is realized irrespective of execution conditions of circuit configuration elements func2 and func3. On the other hand, in the circuit generation system of the first exemplary embodiment, the circuit that can control the electric power by the circuit configuration elements func2 and func3 can be realized.

Therefore, the control can be performed with a higher degree of accuracy, and the power consumption can further be reduced in the whole circuit.

Second Exemplary Embodiment

A second exemplary embodiment will be described below.

The RT-level circuit with the power control circuit is generated by utilizing the control flow information and the delay information.

In the second exemplary embodiment, similarly to the first exemplary embodiment, the function module is the target of the power control.

FIG. 8 shows the behavioral-level description information 121 to which the second exemplary embodiment is applied.

It is assumed that the whole function main( ) is synthesized into the RT-level circuit by the behavioral synthesis.

FIG. 8 shows wait(c) that is included in the behavioral-level description information 121 and indicates standby until a value is input to c.

The behavioral-level description information 121 of FIG. 8 indicates the operation, in which the input of input data c is waited for, func4( ) or func5( ) is executed according to a value of an input signal a, and a result output from func4( ) or func5( ) is output from an output terminal out0.

In the second exemplary embodiment, the series of control operations included in the behavioral-level description information 121 constitutes the control flow information.

It is assumed that variable v is an input of both func4( ) and func5( ), and one clock is necessary for executing func4( ) and two clocks are necessary for executing func5( ).

In the second exemplary embodiment, a time necessary for executing the control target modules (func4 and func5) included in the behavioral-level description information 121 constitutes the delay information.

Figure 9:
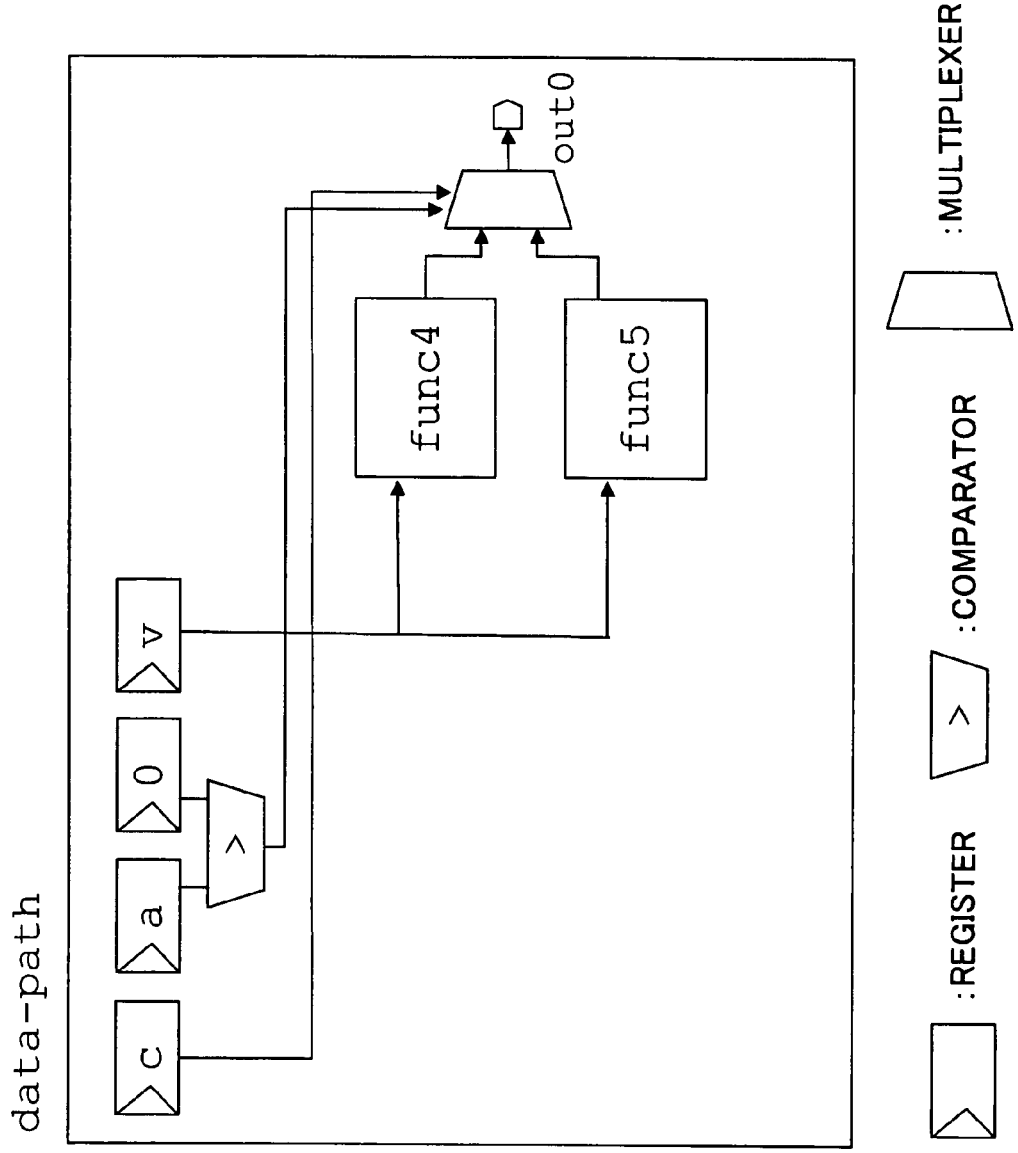
FIG. 9 is a first view for explaining the second embodiment in which the circuit generation system generates the circuit based on the behavioral-level description information of FIG. 8.

FIG. 9 is a block diagram showing a circuit that can be generated by the behavioral synthesis unit 111 based on the behavioral-level description information 121 of FIG. 8.

The method for realizing the circuit of FIG. 9 is an example of the method for realizing the circuit using the behavioral synthesis unit 111. The behavioral synthesis unit 111 realizes each of the functions "func4( ) and func5( )" as one module.

The modules (func4 and func5) are connected to a register in which the variable v to be input is stored.

The output signals of the modules (func4 and func5) are connected to a multiplexer. The input signal c and a comparison result signal of the input signal a and the input signal 0 are connected to the control signal of the multiplexer.

Figure 10:
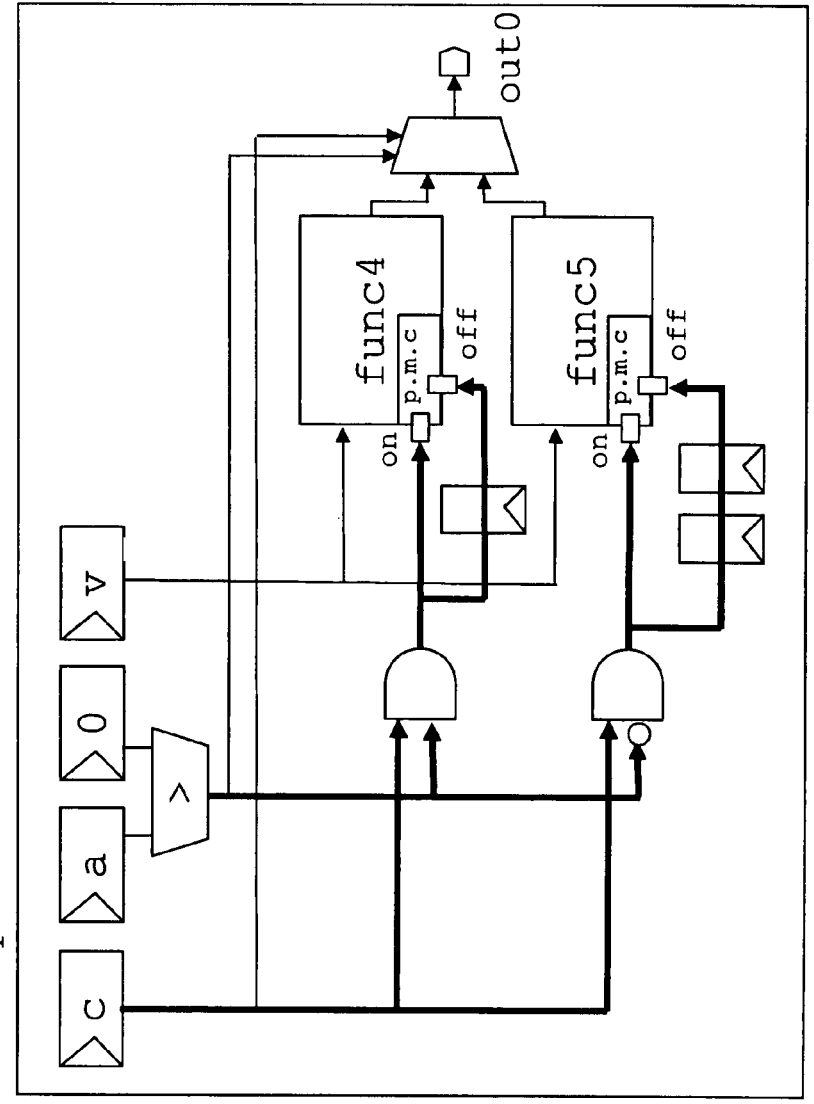
FIG. 10 is a second view for explaining the second embodiment in which the circuit generation system generates the circuit based on the behavioral-level description information of FIG. 8.

FIG. 10 is a block diagram showing a circuit that is generated by the circuit generation system of the second exemplary embodiment.

In the circuit generation system, the power control circuit is added to the RT-level circuit that is generated by the behavioral synthesis unit 111 based on the behavioral-level description information 121 of FIG. 8.

Similarly to the first exemplary embodiment, the power control circuit generation unit 112 generates the gating circuit (p.m.c) for each of the modules (func4 and func5).

The second exemplary embodiment differs from the first exemplary embodiment in the method of connecting the gating circuit (p.m.c) and the RT-level circuit of the RT-level circuit information 122 generated by the behavioral synthesis unit 111.

In the second exemplary embodiment, the power control circuit generation unit 112 generates the control signal to the gating circuit (p.m.c) by utilizing the control flow information of the behavioral-level description information 121 of FIG. 8.

The module (func4) becomes active when the input signal c is input and, at the same time, when the input signal a is larger than the input signal 0.

In the second exemplary embodiment, the power control circuit generation unit 112 utilizes the above-described relationship to connect the output terminal of logical operation of the input signal c and the output value of the comparator to the on terminal of the gating circuit (p.m.c).

For example, the output terminal of conjunction of the input signal c and the output value of the comparator is connected to the on terminal of the gating circuit (p.m.c) for the module (func4).

The output terminal of conjunction of the input signal c and the inverted output-value of the comparator is connected to the on terminal of the gating circuit (p.m.c) for the module (func5).

The power control circuit generation unit 112 generates the signal to the off terminal of the gating circuit (p.m.c) by utilizing the delay information on the control target module of the behavioral-level description information 121 shown in FIG. 8.

In the case where the delay information on the control target module is already known, after the on signal becomes active, power efficiency is improved when the off signal is activated after a delay time of the module elapses.

In the second embodiment, the power control circuit generation unit 112 utilizes the delay information on the control target module of the behavioral-level description information 121 shown in FIG. 8, and inserts the register corresponding to the delay time of the control target module into an output line connected to the off terminal of the gating circuit (p.m.c), allowing the generation of the signal to the off terminal of the gating circuit (p.m.c).

For example, one register is inserted by utilizing the delay information (one clock) on the control target module (func4) in connecting to the off terminal of the gating circuit (p.m.c) for the module (func4).

The two registers are inserted by utilizing the delay information (two clocks) on the control target module (func5) in connecting to the off terminal of the gating circuit (p.m.c) for the module (func5).

Thus, the circuit generation system of the second exemplary embodiment generates the RT-level circuit information 122 indicating func4 and func5 are possibly operated as the circuit even if the execution for the control target modules func4 and func5 is not required. On the contrary, in the circuit generation system of the second exemplary embodiment, even if the control information for the circuit configuration elements func4 and func5 is not utilized, the power control can be performed with high accuracy to realize the circuit in which the power control is lessened.

Third Exemplary Embodiment

A third exemplary embodiment will be described below.

In the third exemplary embodiment, the RT-level circuit with the power control circuit is generated by utilizing the control information and the control flow information.

In the third exemplary embodiment, similarly to the first exemplary embodiment, the function module is the target of the power control.

The behavioral-level description information 121 of the second exemplary embodiment shown in FIG. 8 is applied to the behavioral-level description information 121 of the third exemplary embodiment.

Similarly to the second exemplary embodiment, the behavioral synthesis unit 111 generates a circuit shown in FIG. 9 based on the behavioral-level description information 121 of FIG. 8.

Then, similarly to the second exemplary embodiment, the power control circuit generation unit 112 generates the gating circuit (p.m.c) for each of the modules (func4 and func5).

Figure 11:
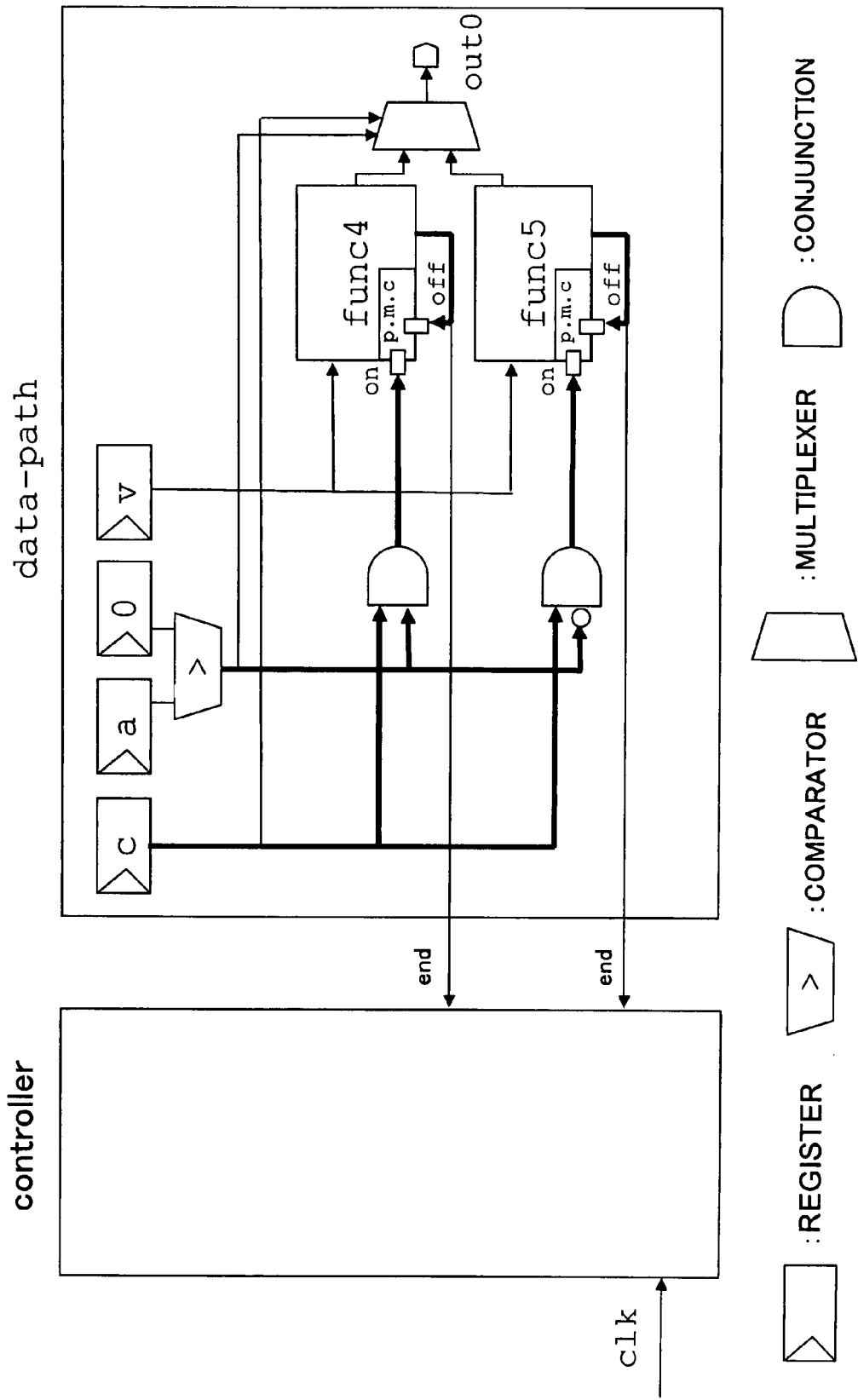
FIG. 11 is a view for explaining a third embodiment in which the circuit generation system generates the circuit based on the behavioral-level description information of FIG. 8.

Then, as shown in FIG. 11, the power control circuit generation unit 112 utilizes the control information and the control flow information to connect the gating circuit (p.m.c) and the RT-level circuit of the RT-level circuit information 122 generated by the behavioral synthesis unit 111.

At this point, the power control circuit generation unit 112 connects the signal generated using the control flow information described in the second exemplary embodiment to the on terminal of the gating circuit (p.m.c).

The power control circuit generation unit 112 connects the control signal (end signal) described in the first exemplary embodiment to the off terminal of the gating circuit (p.m.c).

Thus, the circuit generation system of the third exemplary embodiment generates the RT-level circuit information 122 indicating the correlation between the control target modules constituting the circuit based on the behavioral-level description information 121 in which the information on the circuit is described at the behavioral level.

Then, the circuit generation system generates the power control circuit based on the control information for controlling the control target module and the control flow information indicating the flow of the control necessary for performing the processing of the control target module, and connects the generated power control circuit and the control target module, allowing the generation of the RT-level circuit to which the power control circuit is added.

For example, in the first to third exemplary embodiments, the different RT-level circuit is generated when the pieces of synthesis-attached information differ from each other in generating the power control circuit. Therefore, the circuit designer can realize the RT-level circuit suitable to the required performance by utilizing the circuit generation systems of the first to third exemplary embodiments.

In the third exemplary embodiment, the method of the second exemplary embodiment is applied to the method of connecting the on terminal of the gating circuit (p.m.c), and the method of the first exemplary embodiment is applied to the method of connecting the off terminal of the gating circuit (p.m.c). Alternatively, the method of the first exemplary embodiment may be applied to the method of connecting the on terminal of the gating circuit (p.m.c), and the method of the second exemplary embodiment may be applied to the method of connecting the off terminal of the gating circuit (p.m.c).

Fourth Exemplary Embodiment

A fourth exemplary embodiment will be described below.

In the fourth exemplary embodiment, on the basis of the behavioral-level description information 121, the plural power control circuits having different kinds of power control are generated in the same behavioral-level description information 121, and the RT-level circuits with the plural power control circuits having the different kinds of power control are generated.

In the fourth exemplary embodiment, similarly to the first exemplary embodiment, the function module is the target of the power control.

FIG. 12 shows the behavioral-level description information 121 of the fourth exemplary embodiment.

In the fourth exemplary embodiment, it is assumed that the whole function main is synthesized into the RT-level circuit by the behavioral synthesis.

A function func_static shown in FIG. 12 includes an access to a static variable s therein. A function func_no_static does not include the static variable therein.

In the fourth exemplary embodiment, the functions (func_static and func_no_static) are the processing targets of the power control.

In the case where the function including the static variable is the target of the power control, it is necessary to maintain the value of the static variable. Therefore, the power control in which the power supply is cut off cannot be performed unlike the power gating circuit of FIG. 7. In this case, the standby state in which the power supply is set to a lower level is realized instead of cutting off the power supply. The standby state is a state in which the power supply is maintained between a value of a reference power supply and a value at which the power supply is cut off.

Figure 13:
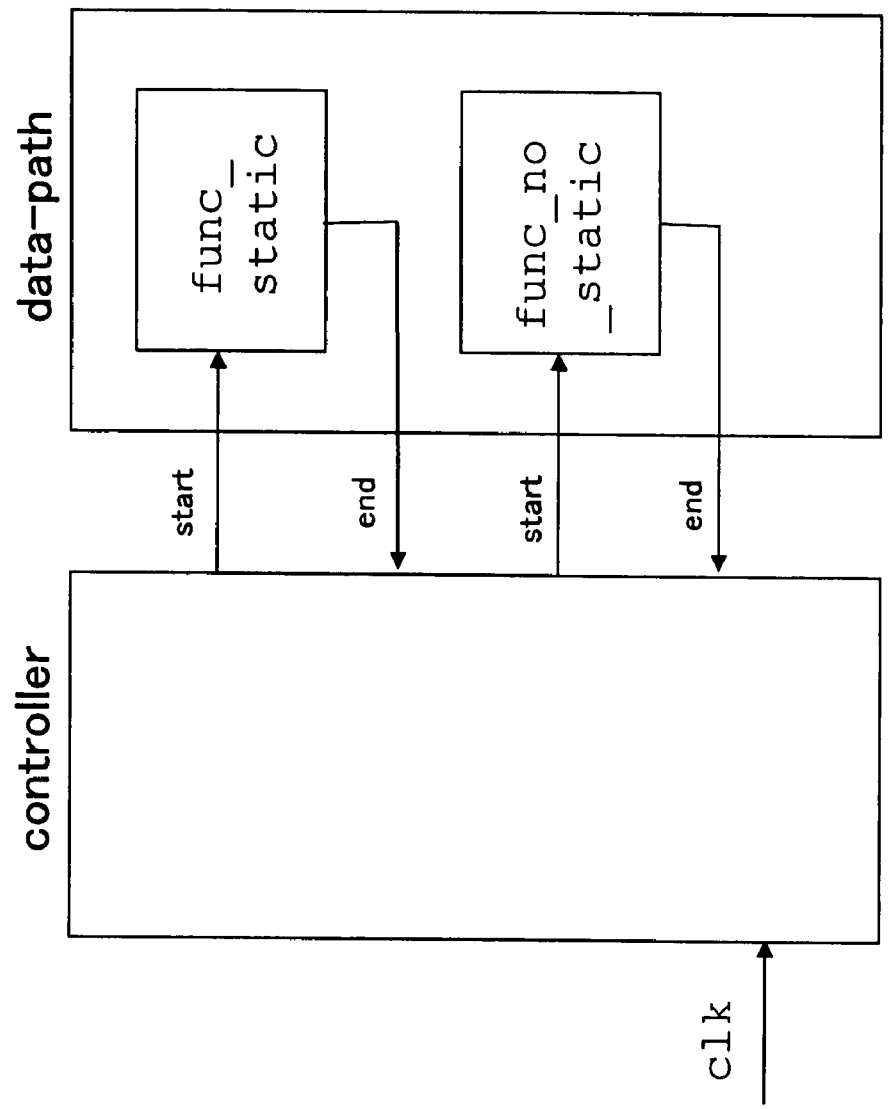
FIG. 13 is a first view for explaining the fourth embodiment in which the circuit generation system generates the circuit based on the behavioral-level description information of FIG. 12.

Similarly to the first exemplary embodiment, the behavioral synthesis unit 111 generates a circuit shown in FIG. 13 based on the behavioral-level description information 121 of FIG. 12.

Then, similarly to the first exemplary embodiment, the power control circuit generation unit 112 generates the gating circuit (p.m.c) for each of the modules (func_static and func_no_static).

Figure 14:
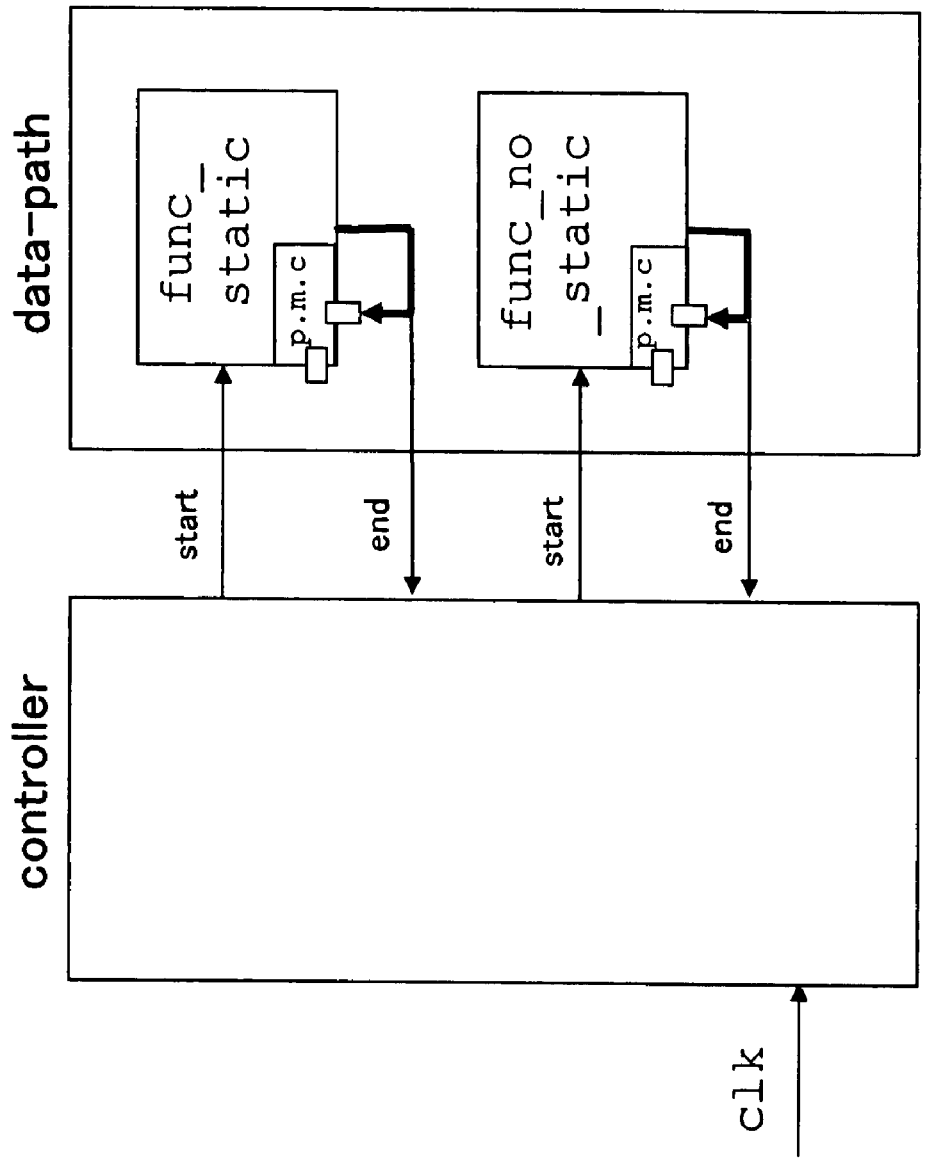
FIG. 14 is a second view for explaining the fourth embodiment in which the circuit generation system generates the circuit based on the behavioral-level description information of FIG. 12.

Then, similarly to the first exemplary embodiment, the power control circuit generation unit 112 utilizes the control information to connect the gating circuit (p.m.c) and the RT-level circuit of the RT-level circuit information 122 generated by the behavioral synthesis unit 111 as shown in FIG. 14.

Figure 15:
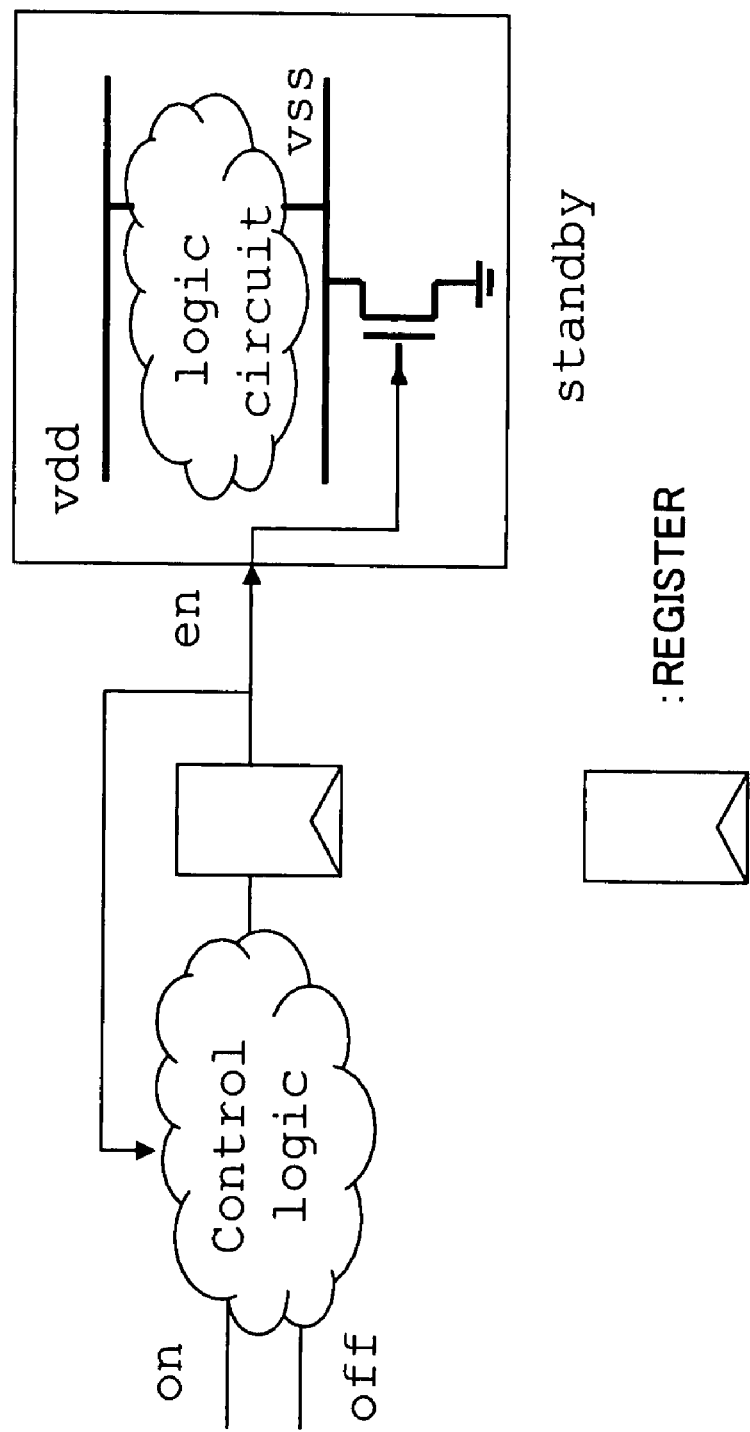
FIG. 15 is a third view for explaining the fourth embodiment in which the circuit generation system generates the circuit based on the behavioral-level description information of FIG. 12.

FIG. 15 shows a gating circuit (p.m.c) which realizes the standby state.

The gating circuit (p.m.c) of FIG. 15 that realizes the standby state can be realized like the power gating circuit of FIG. 7. Similarly to the power gating circuit of FIG. 7, the power control circuit generation unit 112 generates the control signal (en) of the circuit (standby) that realizes the standby state based on the signal of the on/off terminal which is the external terminal, and connects the generated control signal (en) to the switch of the circuit (standby) which realizes the standby state. Then, a virtual power supply voltage is appropriately set to realize the standby state.

Thus, the circuit configuration of the gating circuit (p.m.c) that realizes the standby state realizes the circuit configuration of FIG. 15 similar to that of the power gating circuit of FIG. 7, and set the virtual power supply voltage appropriately to realize the standby state.

The power control circuit of the function func_no_static that does not include the static variable can perform such a power control that the power supply is cut off like the power gating circuit of FIG. 7. Therefore, the method of the fourth embodiment can be applied to realize the power control circuit including the power gating circuit of FIG. 7.

In the fourth exemplary embodiment, on the basis of the behavioral-level description information 121, the plural power control circuits having the different kinds of power control can be generated in the same behavioral-level description information 121, and the RT-level circuits with the plural power control circuits having the different kinds of power control can be generated.

For example, when the behavioral-level description information 121 includes the description in which the value should be maintained during operation of the circuit (for example, static variable and memory), the standby state can be realized, and the RT-level circuit can be realized with lesser power consumption.

For example, the function included in the behavioral-level description information 121 is the target of the power control. Alternatively, a unit of synthesis processing performed by the behavioral synthesis unit 111 or a unit of computing element such as an adder and a subtracter may be the target of the power control. That is, the target of the power control is not particularly limited, but anything may be the target component of the power control.

As shown in FIG. 16, the circuit generation system may include the setting unit 113 which sets one of the clock gating circuit, the power gating circuit, and the gating circuit that controls the power supply in the standby state, as the gating circuit included in the power control circuit. The power control circuit generation unit 112 may be configured to generate the power control circuit including the circuit set by the setting unit 113.

The circuit designer may set any of the circuits. However, when the behavioral-level description information 121 includes the description in which the value should be maintained during operation of the circuit (for example, static variable and memory), the power control circuit including the power gating circuit cannot be generated.

Therefore, in the fourth exemplary embodiment, when the behavioral-level description information 121 is analyzed and determined that the behavioral-level description information 121 includes the description in which the value should be maintained during operation of the circuit (for example, static variable and memory), it is preferable to configure the clock gating circuit or the power control circuit including the gating circuit which controls the power supply in the standby state.

The number of terminals may be increased like on/off/standby to extend the number of states that can be taken by the power control circuit. The setting unit 113 may be not provided in the information processing device 110, but may be provided in the input device 100.

The control operation in each device constituting the circuit generation system of the embodiments can be implemented by hardware, software, or a combination configuration thereof.

When the processing of the software is performed, a program including a processing sequence can be installed in memory of a computer incorporated into the dedicated hardware to execute the program using the computer, or the program can be installed in and executed by a general-purpose computer which can perform various kinds of processing.

For example, the program can previously be recorded in a recording medium, or computer-readable medium such as a hard disk and ROM (Read Only Memory). Alternatively, the program can be stored (recorded) tentatively or permanently in a removable recording medium such as a floppy disk, CD-ROM (Compact Disc Read Only Memory), MO (Magneto-Optical) disk, DVD (Digital Versatile Disc), a magnetic disk, and a semiconductor memory.

The removable recording medium can be provided to a user in the form of so-called package software.

In addition to the installation from the removable recording medium to the computer, the program can be transmitted wirelessly from a download site to the computer. The program can also be transferred by wire to the computer through a network such as LAN (Local Area Network) and the Internet. The computer can receive the transferred program to install the program in the built-in recording medium such as the hard disk.

The processing can be configured to be performed not only in time series according to the processing operation described in the above exemplary embodiments, but also concurrently or separately according to need or processing capacity of the device that performs the processing.

The circuit generation system of the above exemplary embodiments can be configured by a logical set configuration of the plural devices, or can be configured such that the functions of the devices are mixed.

Thus, the exemplary embodiments of the invention have the following features.

The circuit generation system according to an aspect of the invention is characterized by including an behavioral synthesis unit that generates RT-level circuit information indicating a correlation between components constituting a circuit based on behavioral-level description information in which information on the circuit is described at a behavioral level; and a power control circuit generation unit that generates a power control circuit based on at least one piece of information of control information for controlling the component, control flow information indicating a control flow necessary for performing processing of the component, and delay information indicating a time necessary for performing processing of the component, and connects the generated power control circuit and the component.

The circuit generation system according to the aspect of the invention is characterized in that the power control circuit generation unit generates a power control circuit including a gating circuit.

The circuit generation system according to the aspect of the invention is characterized in that the power control circuit generation unit includes a gating circuit generation unit that generates a gating circuit; and an external terminal generation unit that generates an external terminal for the gating circuit.

The circuit generation system according to the aspect of the invention is characterized in that the external terminal includes an input terminal to which a signal is input; and an output terminal from which a signal is output.

The circuit generation system according to the aspect of the invention is characterized in that the gating circuit is formed by one of a clock gating circuit, a power gating circuit, and a gating circuit that controls a power supply in a standby state.

The circuit generation system according to the aspect of the invention is characterized by further including a setting unit that sets one of the clock gating circuit, the power gating circuit, and the gating circuit that controls a power supply in a standby state, as the gating circuit including the power control circuit, wherein the power control circuit generation unit generates the power control circuit including the circuit set by the setting unit.

The circuit generation system according to the aspect of the invention is characterized in that the power control circuit generation unit analyzes behavioral-level description information, and generates a power control circuit including the clock gating circuit or the gating circuit that controls the power supply in the standby state when a description in which a value is to be maintained during operation of the circuit is included in the behavioral-level description information.

The circuit generation system according to the aspect of the invention is characterized in that the power control circuit generation unit generates a plurality of power control circuits having different power control.

The circuit generation system according to the aspect of the invention is characterized by further including a setting unit that sets at least one piece of information of the control information, the control flow information, and the delay information, wherein the power control circuit generation unit generates a power control circuit based on the information set by the setting unit, and connects the generated power control circuit and a component.

The circuit generation system according to the aspect of the invention is characterized in that the power control circuit generation unit generates a power control circuit based on the control information when the behavioral synthesis unit generates the control information.

The circuit generation system according to the aspect of the invention is characterized in that the power control circuit generation unit generates a power control circuit based on the delay information when the behavioral synthesis unit can obtain the delay information.

In a circuit generation method according to another aspect of the invention, an information processing device performs a behavioral synthesis process of generating RT-level circuit information indicating a correlation between components constituting a circuit based on behavioral-level description information in which information on the circuit is described at a behavioral level; and a power control circuit generation process of generating a power control circuit based on at least one piece of information of control information for controlling the component, control flow information indicating a control flow necessary for performing processing of the component, and delay information indicating a time necessary for performing processing of the component, and connecting the generated power control circuit and the component.

A storage medium for storing a circuit generation program according to another aspect of the invention causes an information processing device to execute behavioral synthesis processing for generating RT-level circuit information indicating a correlation between components constituting a circuit based on behavioral-level description information in which information on the circuit is described at a behavioral level; and power control circuit generation processing for generating a power control circuit based on at least one piece of information of control information for controlling the component, control flow information indicating a control flow necessary for performing processing of the component, and delay information indicating a time necessary for performing processing of the component, and connecting the generated power control circuit and the component.

The circuit generation system, the circuit generation method, and the circuit generation program can be applied to the device that can generate the circuit based on the behavioral-level description information in which the information on the circuit is described at the behavioral level.

The invention is not limited to the above embodiments, but those skilled in the art can make various modifications and changes without departing from the scope of the invention.

What is claimed is:

1. A circuit generation system, comprising:
    a behavioral synthesis unit that generates register transistor level (RT-level) circuit information, the R-T level circuit information comprising information of a control unit and a data-path unit, the R-T level circuit information indicating a correlation between circuit components on the data-path unit based on behavioral-level description information in which information on the circuit is described at a behavioral level; and
    a power control circuit generation unit that generates a power control circuit based on at least one piece of information of control information for controlling the circuit components, control flow information indicating a control flow necessary for performing processing of the circuit components, and delay information indicating a time necessary for performing processing of the circuit components, and connects the generated power control circuit and the circuit components.

2. The circuit generation system according to claim 1, wherein the power control circuit generation unit generates a power control circuit including a gating circuit.

3. The circuit generation system according to claim 2, wherein the power control circuit generation unit includes:
    a gating circuit generation unit that generates a gating circuit; and
    an external terminal generation unit that generates an external terminal for the gating circuit.

4. The circuit generation system according to claim 3, wherein the external terminal includes:
    an input terminal to which a signal is input: and
    an output terminal from which a signal is output.

5. The circuit generation system according to claim 2, wherein the gating circuit is formed by any of a clock gating circuit, a power gating circuit, and a gating circuit that controls a power supply in a standby state.

6. The circuit generation system according to claim 5, further comprising a setting unit that sets any of the clock gating circuit, the power gating circuit, and the gating circuit that controls the power supply in the standby state as the gating circuit including the power control circuit,
    wherein the power control circuit generation unit generates a power control circuit including a circuit set by the setting unit.

7. The circuit generation system according to claim 5, wherein the power control circuit generation unit analyzes behavioral-level description information, and
    wherein the power control circuit generation unit generates a power control circuit including the clock gating circuit or the gating circuit that controls the power supply in the standby state when a description in which a value is to be maintained during operation of the circuit is included in the behavioral-level description information.

8. The circuit generation system according to claim 1, wherein the power control circuit generation unit generates a plurality of power control circuits having a different power control.

9. The circuit generation system according to claim 1, further comprising a setting unit that sets at least one piece of information of the control information, the control flow information, and the delay information,
    wherein the power control circuit generation unit generates a power control circuit based on the information set by the setting unit, and connects the generated power control circuit and a circuit component based on the information set by the setting unit.

10. The circuit generation system according to claim 1, wherein the power control circuit generation unit generates a power control circuit based on the control information when the behavioral synthesis unit generates the control information.

11. The circuit generation system according to claim 1, wherein the power control circuit generation unit generates a power control circuit based on the delay information when the behavioral synthesis unit can obtain the delay information.

12. The circuit generation system according to claim 1, wherein the behavioral synthesis unit divides an operation of the circuit component of the behavioral-level description information into a plurality of states.

13. A circuit generation system, comprising:
    behavioral synthesis units that generate RT-level circuit information, the R-T level circuit information comprising information of a control unit and a data-path unit, the R-T level circuit information indicating a correlation between circuit components on the data-path unit, the behavioral synthesis units constituting a circuit based on behavioral-level description information in which information on the circuit is described at a behavioral-level; and
    power control circuit based on at least one piece of information of control information for controlling the circuit components, control flow information indicating a control flow necessary for performing processing of the circuit components, and delay information indicating a time necessary for performing processing of the circuit components generation units which generate a power control circuit, and connecting the generated power control circuit and the circuit components.

14. A circuit generation method, said method comprising:
    a behavioral synthesis process of generating RT-level circuit information, in a processor, the R-T level circuit information comprising information of a control unit and a data-path unit, the R-T level circuit information indicating a correlation between circuit components on the data-path unit based on behavioral-level description information in which information on the circuit is described at a behavioral-level; and a power control circuit generation process of generating a power control circuit, in the processor, based on at least one piece of information of control information for controlling the circuit components, control flow information indicating a control flow necessary for performing processing of the circuit components, and delay information indicating a time necessary for performing processing of the circuit components, and connecting the generated power control circuit and the circuit components.

15. A non-transient storage medium for storing a circuit generation program that causes an information processing device to execute:

behavioral synthesis processing for generating RT-level circuit information, the R-T level circuit information comprising information of a control unit and a data-path unit, the R-T level circuit information indicating a correlation between circuit components on the data-path unit based on behavioral-level description information in which information on the circuit is described at an behavioral-level; and power control circuit generation processing for generating a power control circuit based on at least one piece of information of control information for controlling the circuit components, control flow information indicating a control flow necessary for performing processing of the circuit components, and delay information indicating a time necessary for performing processing of the circuit components, and connecting the generated power control circuit and the circuit components.

* * * * *